United States Patent
Spanedda et al.

(10) Patent No.: US 10,415,670 B2
(45) Date of Patent: Sep. 17, 2019

(54) WORM DRIVE

(71) Applicant: AstroNova, Inc., West Warwick, RI (US)

(72) Inventors: Joseph G. Spanedda, Foster, RI (US); Louis D. Verte, Jr., West Greenwich, RI (US); Jonathan J. Azar, Lincoln, RI (US)

(73) Assignee: AstroNova, Inc., West Warwick, RI (US)

( * ) Notice: Subject to any disclaimer, the term of this patent is extended or adjusted under 35 U.S.C. 154(b) by 44 days.

(21) Appl. No.: 15/590,499

(22) Filed: May 9, 2017

(65) Prior Publication Data

US 2018/0328477 A1 Nov. 15, 2018

(51) Int. Cl.
*F16H 55/08* (2006.01)
*F16H 55/02* (2006.01)
*F16H 55/22* (2006.01)
*F16H 1/16* (2006.01)

(52) U.S. Cl.
CPC ........... *F16H 1/16* (2013.01); *F16H 55/0813* (2013.01); *F16H 55/02* (2013.01); *F16H 55/22* (2013.01)

(58) Field of Classification Search
CPC ... F16H 1/02; F16H 1/16; F16H 1/225; F16H 3/06; F16H 55/02; F16H 55/0813; F16H 55/0806; F16H 55/12
USPC .................................................. 74/89.14, 425
See application file for complete search history.

(56) References Cited

U.S. PATENT DOCUMENTS

| | | | | |
|---|---|---|---|---|
| 3,851,537 A | * | 12/1974 | Nickstadt | F16H 1/222 74/404 |
| 4,222,218 A | * | 9/1980 | Moe | A01D 45/025 460/116 |
| 4,459,867 A | * | 7/1984 | Jones | F16H 25/2021 192/150 |
| 5,221,869 A | * | 6/1993 | Williams | H02K 5/24 310/40 MM |
| 6,029,763 A | | 2/2000 | Swisher | |
| 6,044,723 A | * | 4/2000 | Eda | B62D 5/0409 74/388 PS |

(Continued)

OTHER PUBLICATIONS

"DIY Worm Gear Based Heliostat Design," Cerebral Meltdown, pp. 1-16 (Jun. 25, 2013).

(Continued)

*Primary Examiner* — Zakaria Elahmadi
*Assistant Examiner* — Bobby Rushing, Jr.
(74) *Attorney, Agent, or Firm* — Foley Hoag LLP; Rajesh Vallabh

(57) ABSTRACT

A worm drive includes a worm wheel having two spaced-apart outer rims defining an annular channel therebetween for receiving at least a portion of a worm screw. Each of the rims include a set of side teeth in the annular channel extending that are spaced apart from and face the set of teeth of the other rim. The two sets of teeth capture the worm screw and mesh with the screw thread of the worm screw such that the worm screw is engaged by the teeth only on spaced-apart locations on opposite sides of the worm screw. There are no resultant forces in an axial direction of the worm wheel during operation of the worm drive. Also, the worm screw and the worm wheel are self-aligning in the axial direction of the worm wheel.

18 Claims, 7 Drawing Sheets

(56) References Cited

U.S. PATENT DOCUMENTS

| | | | | |
|---|---|---|---|---|
| 6,766,686 | B2* | 7/2004 | Greubel | F16H 1/16 73/162 |
| 7,562,645 | B2* | 7/2009 | Lichti | F01L 1/34 123/90.15 |
| 8,590,412 | B2 | 11/2013 | Lin | |
| 8,616,080 | B2* | 12/2013 | Flatt | B64C 13/50 244/99.2 |
| 2007/0137352 | A1* | 6/2007 | Hrushka | F16H 1/16 74/425 |
| 2008/0105072 | A1* | 5/2008 | Chen | F16H 1/166 74/425 |
| 2012/0000305 | A1* | 1/2012 | Kazkaz | F16H 1/16 74/416 |
| 2014/0338478 | A1* | 11/2014 | Adam | F16D 43/215 74/89.14 |
| 2015/0020387 | A1* | 1/2015 | Broghammer | B23P 15/14 29/893.1 |
| 2017/0210412 | A1* | 7/2017 | Segawa | B62D 5/04 |

OTHER PUBLICATIONS

Pistorius, "Making a new worm gear for a camera tracker," stars*in*photos, pp. 1-8 (May 10, 2014).
Wikipedia, "Worm Drive," https://en.wikipedia.org/wiki/Worm_drive, Downloaded Mar. 30, 2017.

* cited by examiner

WORM DRIVE

BACKGROUND

The present application relates generally to gear systems for transmitting torque and, more particularly, to worm drives.

Worm drives have been used for many years. FIG. 1 shows an example of a prior art worm drive 100. The worm drive 100 includes a worm screw 102 and a worm wheel 104. The worm screw 102 includes a threaded portion 106 that meshes with teeth 108 extending around the worm wheel 104.

One advantage of worm drives is that they can produce a very low gear ratio and provide a large torque multiplication. Another advantage of worm drives is that they can act as a brake, as the output shaft cannot drive the input shaft.

A significant disadvantage of worm drives is that they generally require very precise positioning of the worm wheel relative to the worm screw to work. Any variation side to side or up and down will affect tooth engagement and can lead to premature failure.

In addition, the frictional force between the worm screw and the worm wheel teeth imparts a side load on the worm screw. This load is transmitted to the worm shaft and to its support bearings.

There are many applications where a worm drive system could be advantageously used, but the requirement of high precision makes it impractical. Also, the side loads generated require the drive system to have larger bearings than would otherwise be needed. For example, a simple lifting mechanism could benefit by a worm drive system because of the low gear ratio and the self-holding ability of a worm drive. Often, this type of system is driven by a small motor in an imprecise housing. The housing is not precise enough to allow this drive system to work effectively, and the small motor may not be designed for excessive side loads. This results in a gear system that is vulnerable to failure and a motor that is vulnerable to bearing failure.

BRIEF SUMMARY OF THE DISCLOSURE

A worm drive in accordance with one or more embodiments includes a worm screw and a worm wheel. The worm screw has a shaft having screw thread extending helically about the shaft. The worm wheel has two spaced-apart outer rims defining an annular channel therebetween for receiving at least a portion of the worm screw. Each of the rims includes a set of teeth thereon in the annular channel extending around the wheel that are spaced apart from and facing the set of teeth of the other rim. The two sets of teeth capture the worm screw and mesh with the screw thread of the worm screw such that the worm screw is engaged by the teeth of the worm wheel only on spaced-apart locations on opposite sides of the worm screw.

A worm drive in accordance with one or more further embodiments includes a worm screw and a worm wheel. The worm screw has a shaft having screw thread extending helically about a portion of the shaft. The worm wheel includes means for capturing the worm screw and meshing with the screw thread of the worm screw such that the worm screw is engaged by the worm wheel only on spaced-apart locations on opposite sides of the worm screw.

BRIEF DESCRIPTION OF THE DRAWINGS

Like or identical reference numbers are used to identify common or similar elements.

DETAILED DESCRIPTION

Figure 2:
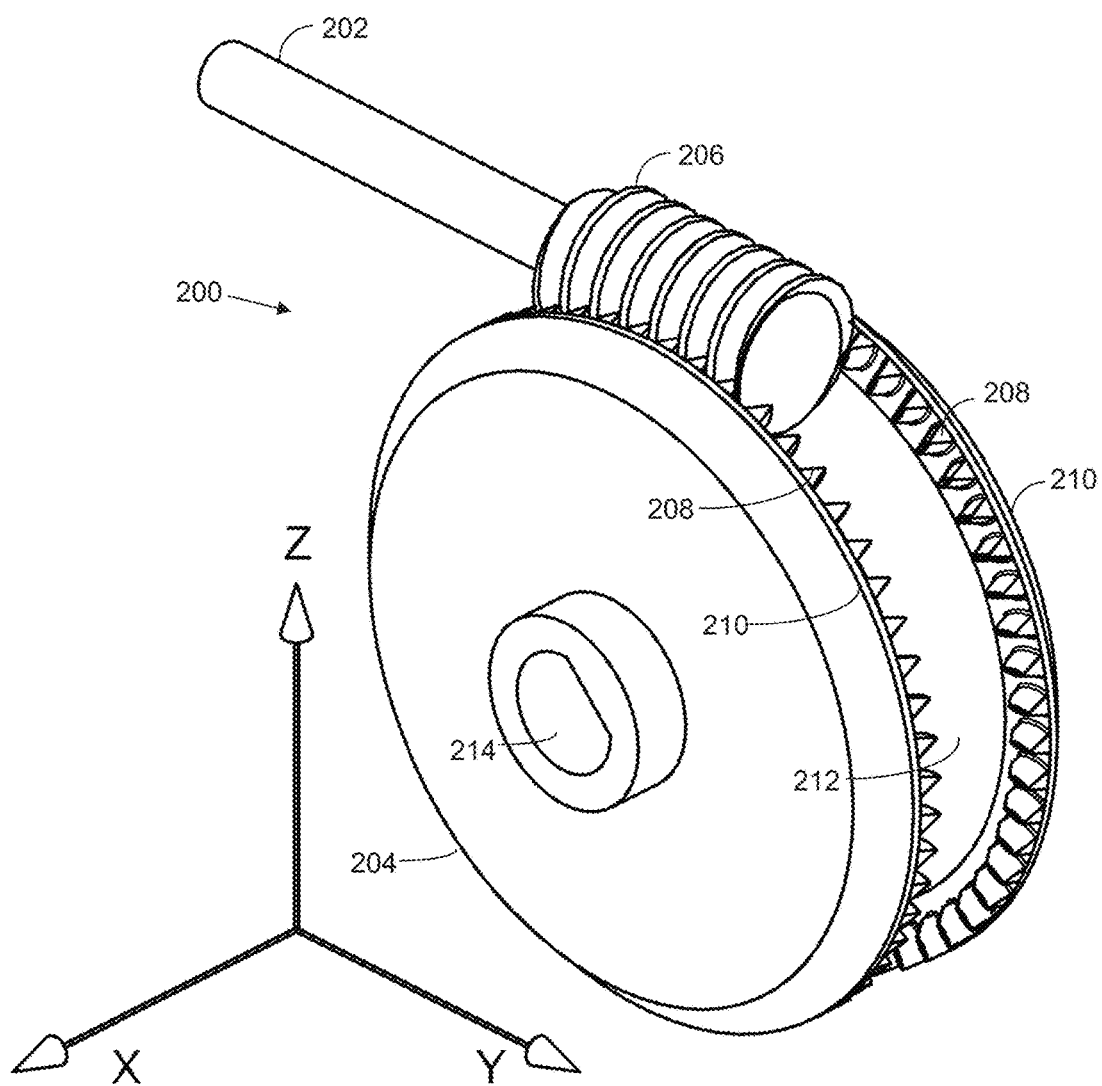
FIG. 2 is a perspective view of an exemplary worm drive in accordance with the one or more embodiments.

FIG. 2 illustrates an exemplary worm drive 200 in accordance with one or more embodiments. The worm drive 200 includes a worm screw 202 and a worm wheel 204. The worm screw 202 includes screw thread 206 that meshes with teeth 208 extending around the worm wheel 204 for the transmission of power.

The worm wheel 204 includes two spaced-apart outer rims 210 defining an annular channel 212 therebetween for receiving at least a portion of the worm screw 202. Each of the rims 210 includes a set of teeth 208 in the annular channel 212 extending around the wheel 204. The teeth 208 on one rim 210 are spaced apart from and face the teeth 208 of the other rim 210. The two sets of teeth 208 capture the worm screw 202 and mesh with the worm screw thread 206. The worm screw 202 is engaged by the worm wheel teeth 208 only on spaced-apart locations on sides of the worm screw 202.

Figure 1:
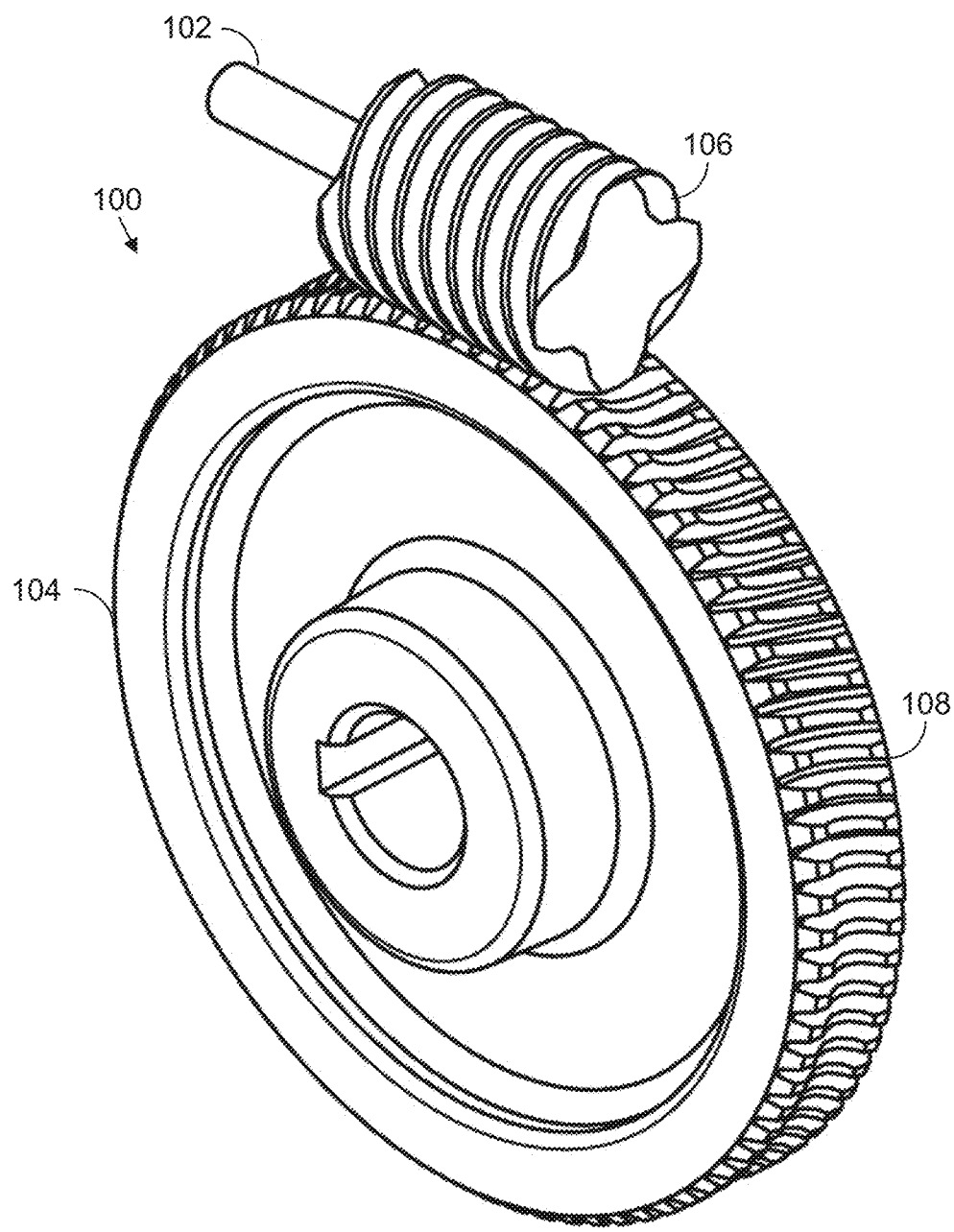
FIG. 1 is a perspective view of an exemplary worm drive in accordance with the prior art.

The worm drive 200 of FIG. 2 has several advantages over the worm drive 100 of FIG. 1. In the worm drive 100, any variation in the Z direction (see 3D coordinate system in FIG. 2 for reference) can result in improper tooth engagement between the worm 102 and the worm gear 104. With the side tooth design of FIG. 2, the worm gear 204 engages the worm 202 on the sides of the worm, and is minimally affected by variations in the Z direction. This enables a less precise and less costly assembly for the worm drive 200.

Additionally, in the worm drive 100 of FIG. 1, any variation in the X direction (the axial direction of the worm wheel 104) can result in tooth misalignment potentially causing early failure and other problems. The X direction must be held accurately in order to insure proper alignment. On the side tooth gear design of FIG. 2, the worm wheel 204 and/or worm 202 can be allowed to float in the X direction as the worm is captured between the worm wheel teeth 208, resulting in a self-aligning gear. This allows for a less precise, less costly, and more reliable assembly.

In order to take advantage of the self-aligning feature, the worm wheel 204 is allowed to float in the X direction. This is accomplished by having a bore 214 in the wheel 204 have clearance with the shaft (not shown). The self-aligning feature can also be accomplished by allowing the worm screw 202 to float a given distance in the X direction and the worm wheel 204 to be mounted rigidly to the shaft. The bore 214 in the wheel 204 can be of many standard drive configurations such as a D-hole, splined, keyed, square, hex, etc.

The tooth profile on the worm wheel 204 can be configured to have multiple teeth 208 in contact with the worm screw 202, such as an involute profile. This enables greater power transmission as the multiple teeth will share the load. Also, because the worm wheel 204 has two sets of teeth 208, the load is distributed over twice as many teeth thereby increasing load capacity.

The opposing teeth 208 on the worm wheel 204 contact the worm screw 202 on opposite sides at spaced apart locations. The resulting frictional force provides a pure mechanical couple to the worm 202. This results in a zero resultant force and thereby eliminates any X direction resultant forces which that are normally transferred to the mounting bearings of the worm shaft.

Figure 3:
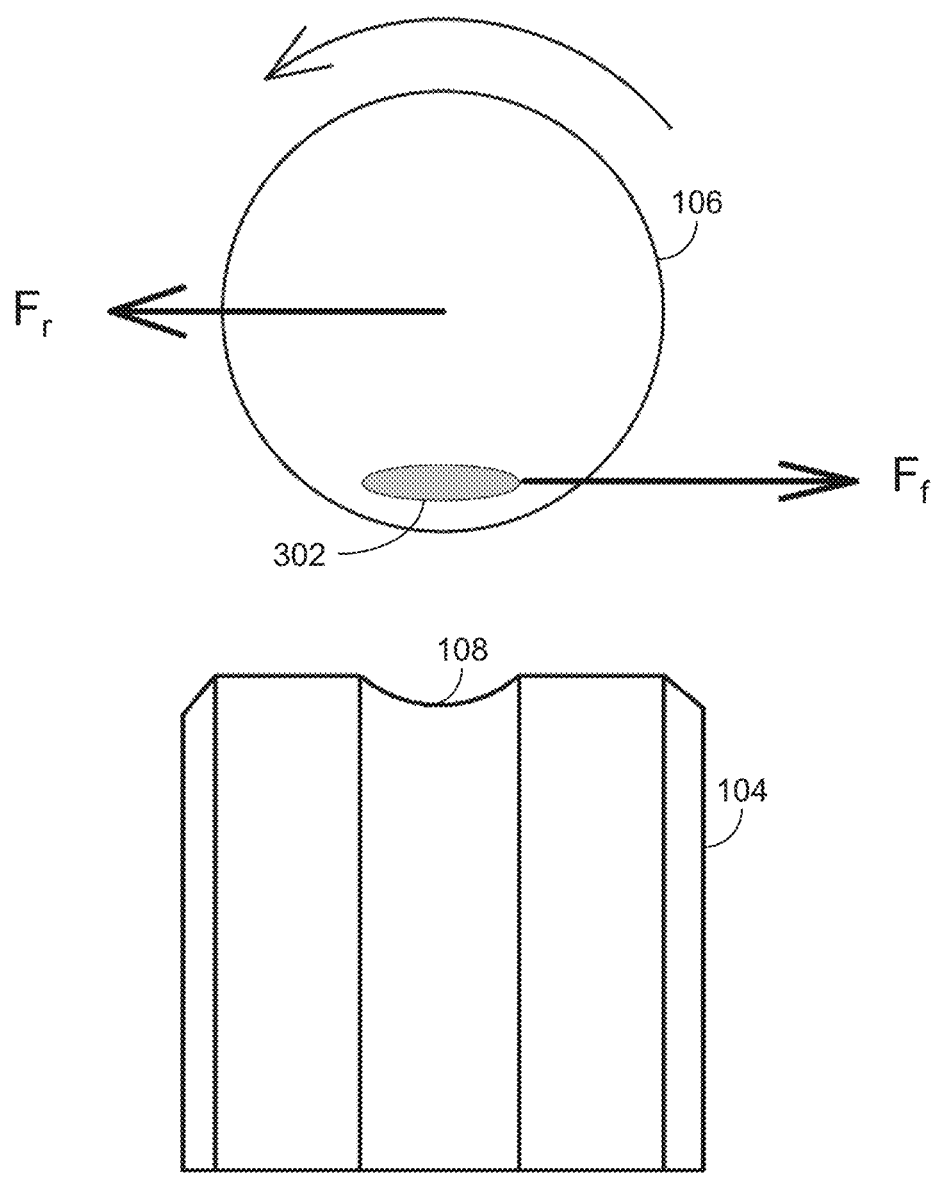
FIG. 3 is a simplified diagram illustrating forces applied to the worm screw during operation of the FIG. 1 worm drive.

FIG. 3 shows the contact area 302 on the worm 102 of the FIG. 1 worm drive 100. The frictional force is shown as Ff. Since the sum of all forces must equal zero, there is a reaction force Fr. This reaction force is transferred to the support bearings. In this design, the support bearings for the worm shaft must accommodate this side load.

Figure 4:
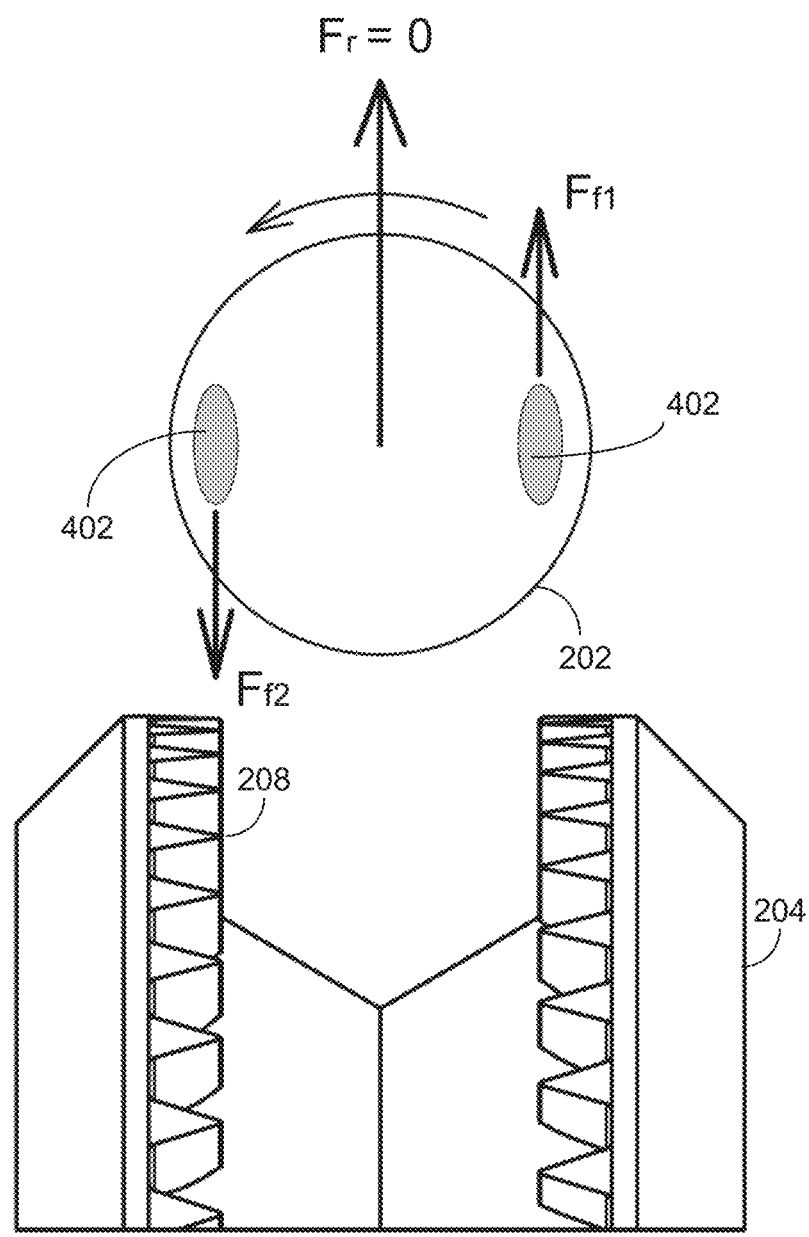
FIG. 4 is a simplified diagram illustrating forces applied to the worm screw during operation of the FIG. 2 worm drive.

As shown in FIG. 4, in the side tooth design of the FIG. 2 worm drive 200, there are two areas of contact 402 at opposite sides of the worm 202. The frictional forces for these two areas Ff1 and Ff2 are equal in magnitude and in opposite directions, thereby cancelling each other out. They thereby form a perfect mechanical couple and there is no reaction force Fr. This relieves the support bearings of any side loads. In many cases, a small electric motor may be used as there are no side loads to handle.

Figure 5:
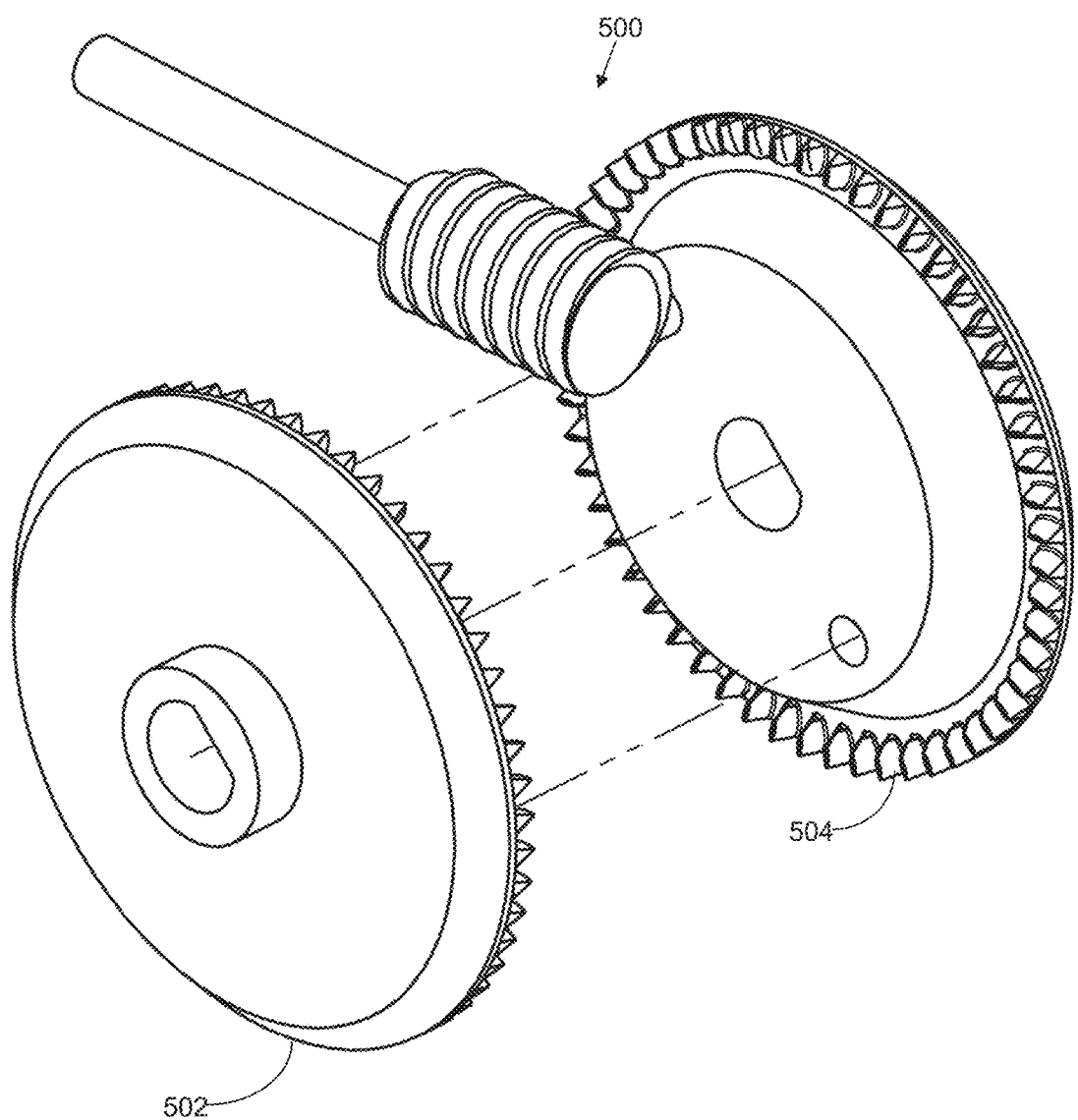
FIG. 5 is an exploded view of an exemplary worm drive in accordance with one or more further embodiments.

Worm wheels in accordance with various embodiments can be made in a single integrated structure or from multiple parts to facilitate processes such as molding. As shown in FIG. 5, a worm drive 500 may have a worm wheel made of two parts 502, 504 that are then joined together by various processes including, e.g., welding, adhesives, screws, rivets, snaps, etc.

Figure 6:
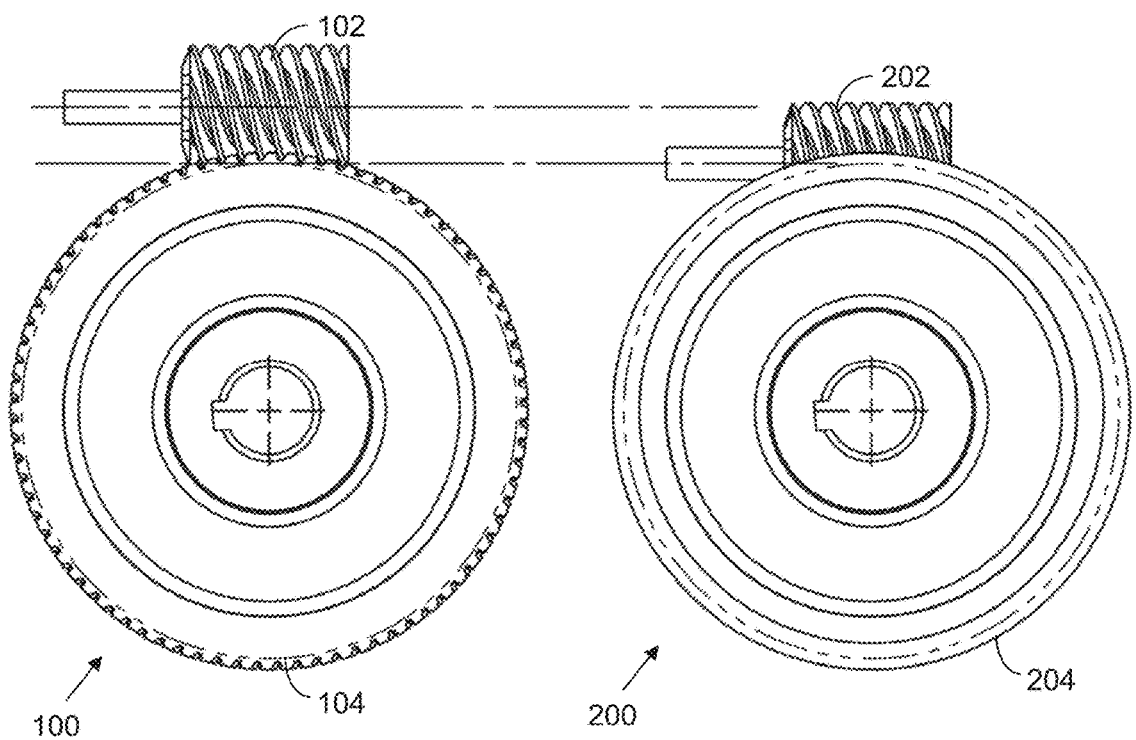
FIG. 6 show a comparison of the profiles of the FIGS. 1 and 2 worm drives.

Another advantage of worm drives in accordance with one or more embodiments is that they can have a more compact design given the same gear ratios and tooth count. FIG. 6 shows a comparison of the profiles of the FIG. 1 prior art worm drive 100 and the FIG. 2 worm drive 200. In the FIG. 1 worm drive 100, the pitch radius (one half the worm pitch diameter) is added to the pitch radius of the worm wheel 104 and contributes to the overall height of the drive 100. With the side tooth design 200 of FIG. 2, the centerline of the worm 202 is in line with the pitch radius of the worm wheel 204. This reduces the overall height of the worm drive by the pitch radius of the worm and the profile of the drive.

Also, because of the elimination of side loads (as discussed above), in accordance with one or more embodiments, there is no need for a support bearing on the worm shaft. This also contributes to a more compact and less expensive design.

Figure 7A:
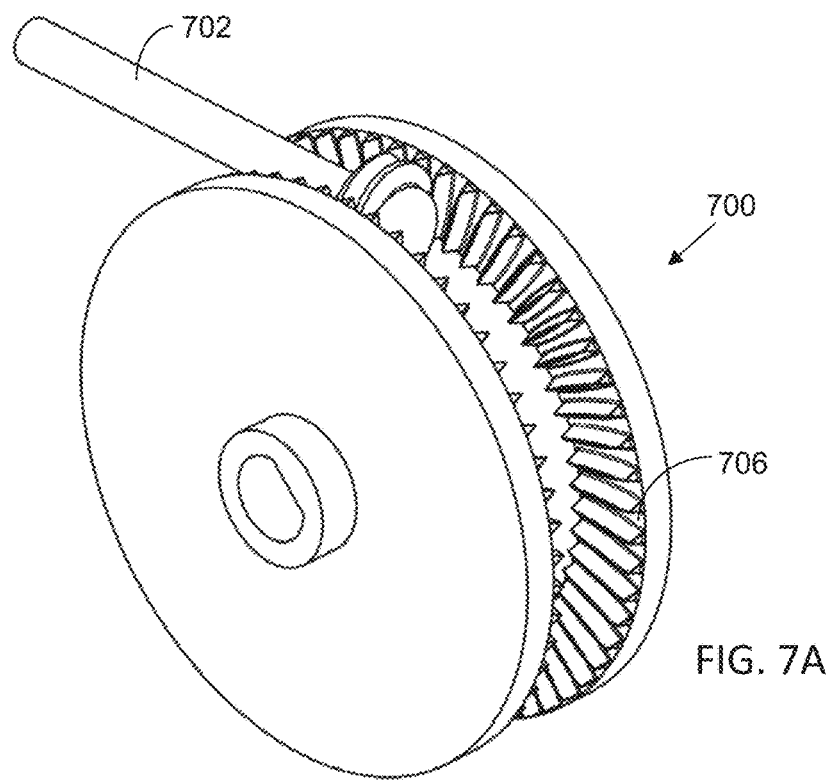
FIGS. 7A and 7B illustrate an exemplary worm drive in accordance with one or more further embodiments.
Figure 7B:
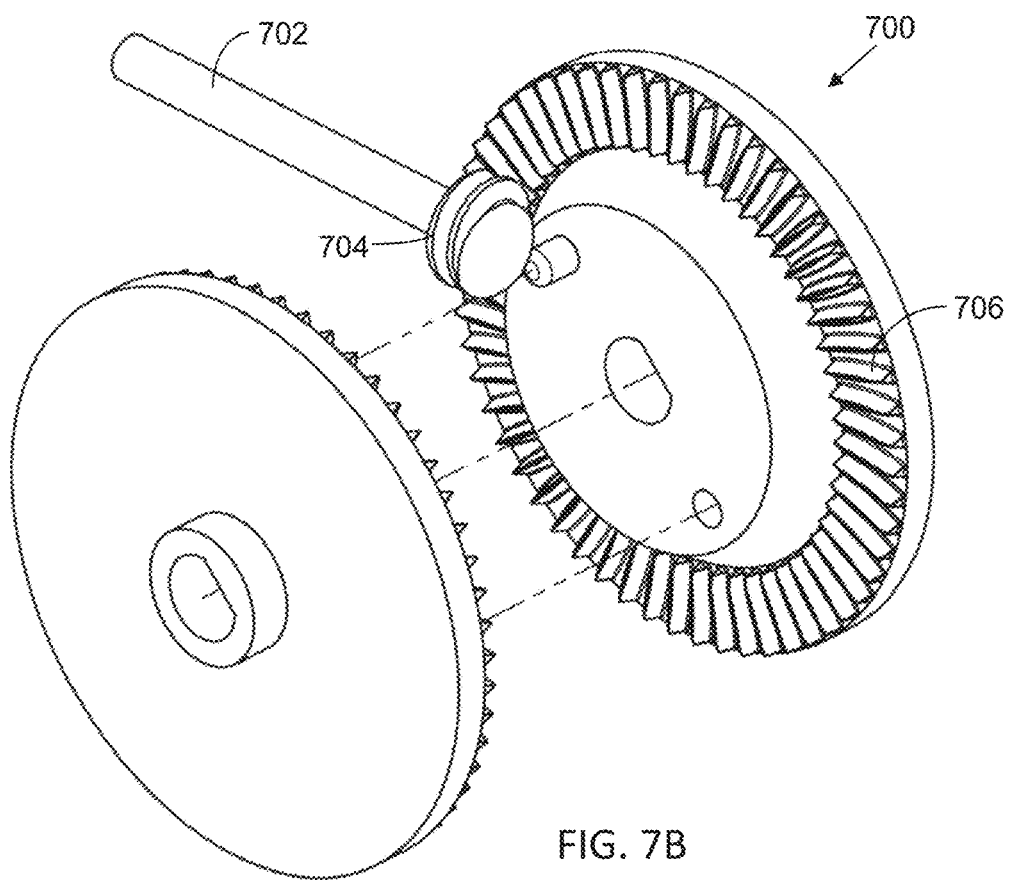

An alternate design can be used when there is an imbalance of material properties between the worm screw and the worm wheel. In some applications, the worm screw may be significantly stronger than the worm wheel. For example, the worm may comprise brass and the worm wheel may comprise nylon. The worm wheel teeth should be designed to not interfere with the worm thread. In some cases, the worm wheel teeth can become small and weak. This can happen when the worm wheel is relatively small compared to the worm. Where there is a possibility of worm wheel tooth failure, the worm can be designed to be shorter, having fewer threads. FIGS. 7A and 7B illustrate an exemplary worm drive 700 in accordance with one or more embodiments, wherein the worm screw 702 has a shorter threaded portion with a reduced number of threads 704. This design allows the worm wheel teeth 706 to be larger and stronger.

Worm drives in accordance with various embodiments can be used in a variety of applications including, e.g., in lifting and other mechanisms in printers, copy machines, drones, cameras, retractable awnings, and other apparatus. However, it should be understood that the worm drives are not limited to any particular application, device, or industry.

Worm drives in accordance with various embodiments can be manufactured using various manufacturing processes, including 3D printing technology, advanced CNC machining, casting, molding, and stamping, among other processes.

The worm wheel and worm screw in accordance with various embodiments can be made of a variety of materials including, but not limited to, metal, plastic, wood, paper, and generally any 3D printing material.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. A worm drive, comprising:
   a worm screw comprising a shaft having a longitudinal axis and having screw thread extending helically about the shaft; and
   a worm wheel having two spaced-apart outer rims defining an annular channel therebetween for receiving at least a portion of the worm screw, each of said rims including a set of teeth thereon in the annular channel extending around the wheel that are spaced apart from and facing the set of teeth of the other rim, wherein the two sets of teeth capture the worm screw and mesh with the screw thread of the worm screw such that the worm screw is engaged by the teeth of the worm wheel only on two spaced-apart locations on opposite sides of the worm screw such that a line extending through the two spaced-apart locations is substantially perpendicular to the longitudinal axis of the shaft of the worm screw, and the worm screw is not engaged by the worm wheel at other locations between said two spaced-apart locations on the worm screw, and wherein the worm screw and the worm wheel are self-aligning in an axial direction of the worm wheel.

2. The worm drive of claim 1, the worm screw or the worm wheel can float a given distance relative to each other in an axial direction of the worm wheel.

3. The worm drive of claim 1, the worm wheel includes a center bore adapted to receive and engage a wheel shaft, and wherein the worm wheel has clearance with the wheel shaft or wherein the worm wheel is rigidly connected to the wheel shaft and the worm screw has a given float in an axial direction of the worm wheel.

4. The worm drive of claim 1, wherein each of said teeth of the worm wheel have an involute profile, and multiple teeth from each set of teeth engage the worm screw at a time.

5. The worm drive of claim 1, wherein the worm screw engages the worm wheel in a pure mechanical coupling with no resultant forces in an axial direction of the worm wheel.

6. The worm drive of claim 1, wherein engagement of the worm screw by the teeth of the worm wheel on the spaced-apart locations on the sides of the worm screw results in a zero resultant force in an axial direction of the worm wheel.

7. The worm drive of claim 1, wherein the worm screw and the worm wheel comprise metal, plastic, wood, paper, or a 3D printing material.

8. The worm drive of claim 1, wherein a centerline of the worm screw coincides with a pitch radius of the worm wheel.

9. The worm drive of claim 1, wherein the worm screw and the worm wheel are manufactured by 3D printing technology, CNC machining, casting, molding, or stamping processes.

10. The worm drive of claim 1, wherein the worm wheel comprises a single integrated structure containing the two rims.

11. The worm drive of claim 1, wherein the worm wheel comprises two parts joined together, each part containing one of the two rims.

12. The worm drive of claim 1, wherein the worm drive is configured for use in a lifting mechanism.

13. A worm drive, comprising:
a worm screw comprising a shaft having a longitudinal axis and having screw thread extending helically about a portion of the shaft; and
a worm wheel including means for capturing the worm screw and meshing with the screw thread of the worm screw such that the worm screw is engaged by the worm wheel only on two spaced-apart locations on opposite sides of the worm screw, and the worm screw is not engaged by the worm wheel at other locations between said two spaced-apart locations on the worm screw such that a line extending through the two spaced-apart locations is substantially perpendicular to the longitudinal axis of the shaft of the worm screw, and there are no resultant forces in an axial direction of the worm wheel during operation of the worm drive, and wherein the worm screw and the worm wheel are self-aligning in an axial direction of the worm wheel.

14. The worm drive of claim 13, the worm screw or the worm wheel can float a given distance relative to each other in an axial direction of the worm wheel.

15. The worm drive of claim 13, the worm wheel includes a center bore adapted to receive and engage a wheel shaft, and wherein the worm wheel has clearance with the wheel shaft or wherein the worm wheel is rigidly connected to the wheel shaft and the worm screw has a given float in an axial direction of the worm wheel.

16. The worm drive of claim 13, wherein the worm screw engages the worm wheel in a pure mechanical coupling.

17. The worm drive of claim 13, wherein a centerline of the worm screw coincides with a pitch radius of the worm wheel.

18. A worm drive, comprising:
a worm screw comprising a shaft having a longitudinal axis and having screw thread extending helically about the shaft; and
a worm wheel having two spaced-apart outer rims defining an annular channel therebetween for receiving at least a portion of the worm screw, each of said rims including a set of side teeth thereon in the annular channel extending around the wheel that are spaced apart from and facing the set of teeth of the other rim, wherein the two sets of teeth capture the worm screw and mesh with the screw thread of the worm screw such that the worm screw is engaged by the teeth of the worm wheel only on two spaced-apart locations on opposite sides of the worm screw such that a line extending through the two spaced-apart locations is substantially perpendicular to the longitudinal axis of the shaft of the worm screw, and the worm screw is not engaged by the worm wheel at other locations between said two spaced-apart locations on the worm screw, and there are no resultant forces in an axial direction of the worm wheel during operation of the worm drive, and wherein the worm screw and the worm wheel are self-aligning in an axial direction of the worm wheel.

* * * * *